United States Patent [19]

Chlanda

[11] Patent Number: 5,288,378
[45] Date of Patent: Feb. 22, 1994

[54] GUARD MEMBRANES FOR USE IN ELECTRODIALYSIS CELLS

[75] Inventor: Frederick P. Chlanda, Rockaway, N.J.

[73] Assignee: AlliedSignal Inc., Morristownship, Morris County, N.J.

[21] Appl. No.: 759,811

[22] Filed: Sep. 18, 1991

Related U.S. Application Data

[63] Continuation-in-part of Ser. No. 590,116, Sep. 28, 1990, Pat. No. 5,126,026.

[51] Int. Cl.$^5$ .................... B01D 61/44; C02F 1/469
[52] U.S. Cl. .................... 204/182.4; 204/182.5; 204/182.6; 204/301
[58] Field of Search .............. 204/182.4, 182.5, 182.3, 204/301, 182.6

[56] References Cited

U.S. PATENT DOCUMENTS

| | | | |
|---|---|---|---|
| 2,758,965 | 8/1956 | Block et al. | 204/180 |
| 2,810,686 | 10/1957 | Bodamer et al. | 104/130 |
| 2,829,095 | 4/1958 | Oda et al. | 204/98 |
| 3,220,941 | 11/1965 | Osborne et al. | 204/87 |
| 3,310,481 | 3/1967 | Mock et al. | 204/180 |
| 3,510,418 | 5/1970 | Mitzutani et al. | 204/181 |
| 3,725,235 | 3/1973 | Mintz | 204/180 P |
| 3,905,886 | 9/1974 | Wang | 204/180 |
| 4,012,324 | 3/1977 | Gregor | 210/500 |
| 4,024,043 | 5/1977 | Dege et al. | 204/296 |
| 4,057,482 | 11/1977 | Giuffrida | 204/180 P |
| 4,116,889 | 9/1978 | Chlanda et al. | 521/27 |
| 4,217,200 | 8/1980 | Kedem et al. | 204/301 |
| 4,391,680 | 7/1983 | Mani et al. | 204/98 |
| 4,504,373 | 3/1985 | Mani et al. | 204/180 P |
| 4,536,269 | 8/1985 | Chlanda et al. | 204/182.4 |
| 4,557,815 | 12/1985 | Scott et al. | 204/182.2 |
| 4,608,140 | 8/1986 | Goldstein | 204/182.3 |
| 4,608,141 | 8/1986 | Chlanda et al. | 204/182.5 |
| 4,738,764 | 4/1988 | Chlanda et al. | 204/296 |
| 4,740,281 | 4/1988 | Chlanda et al. | 204/151 |
| 4,766,161 | 8/1988 | Chlanda et al. | 521/27 |
| 4,964,960 | 10/1990 | Keating et al. | 204/98 |
| 4,969,982 | 11/1990 | Miyake et al. | 204/98 |
| 4,983,264 | 1/1991 | Miyake et al. | 204/98 |
| 5,126,026 | 6/1992 | Chlanda | 204/182.4 |

FOREIGN PATENT DOCUMENTS 2645044 10/1990 France .
79/00040 2/1979 PCT Int'l Appl. .

OTHER PUBLICATIONS

Bull. Chem. Soc. JPN 38, May (1965) Mizutani et al. "Semicontinuous Preparation of Ion Exchange Membranes", pp. 689–694.

Synthetic Membrane: *Science, Engineering and Applications*, PM Buengay, HK Lonsdale, MN dePinho Dreidel Publ Co., Dordrecht Holland, by Strathmann, pp. 197–223 [no date].

*Primary Examiner*—T. Tung
*Assistant Examiner*—Arun S. Phasge
*Attorney, Agent, or Firm*—Karen A. Harding; Pay P. Friedenson

[57] ABSTRACT

The present invention relates to an improved apparatus of the type containing membranes which are selectively permeable to ion transport and a related method. The apparatus comprises at least one guard membrane located adjacent to a first membrane. A conductive bridge is formed between the guard and first membrane, either by adding an adhesive layer between the membranes or by treating the surface of the guard membrane. The adhesive layer between the guard and first membranes is preferably highly water swollen. The apparatus comprises at least one unit cell comprising at least one first membrane and one guard membrane which are held together by a static ionically conductive layer or interface. The guard membranes of the present invention are particularly useful in weak acid systems and prevent the formation of a non-conducting layer which greatly increases potential across the cell.

23 Claims, 4 Drawing Sheets

GUARD MEMBRANES FOR USE IN ELECTRODIALYSIS CELLS

This application is a continuation in part of U.S. application Ser. No. 590,116 filed on Sep. 28, 1990 now U.S. Pat. No. 5,126,026.

BACKGROUND OF THE INVENTION

1. Field of the Invention

This invention relates to an improved electrodialysis apparatus and method. More particularly, the invention is a guard membrane which functions as an additional ion selective barrier and is located adjacent to and in contact with a first membrane. The guard membranes of the present invention are particularly useful in weak acid systems.

2. Description of Related Art

Electrodialysis uses direct current as a means to cause the movement of ions in solutions. Electrodialysis processes are well known in the art and are typically carried out in a stack arrangement comprising a plurality of flat sheet membranes. The stack consists of electrodes (anode and cathode) at either end and a series of membranes and gaskets which are open in the middle to form a multiplicity of compartments separated by the membranes. Usually, a separate solution is supplied to the compartments containing the electrodes. Special membranes may be placed next to the electrode containing compartments in order to prevent mixing of the process streams with the electrode streams. The majority of the stack between the electrode compartments comprises a repeating series of units of different membranes with solution compartments between neighboring membranes. The repeating unit is called the unit cell, or simply, a cell. Solution is typically supplied to the compartments by internal manifolds formed as part of the gaskets or by a combination of internal and external manifolds. The stacks can include more than one type of unit cell. Streams may be fed from one stack to another in order to optimize process efficiency. Usually the change in composition of a stream after one pass through the stack is relatively small and the solutions can be recycled by being pumped to and from recycle tanks. Addition of fresh solution to and withdrawal of product from the recycle loop can be made either continuously or periodically in order to control the concentration of products in a desired range.

Treatment of aqueous salt streams by electrodialysis to form acid and/or base from the salt is known. The aqueous salt stream is fed to an electrodialytic water splitting apparatus which comprises an electrodialysis stack and a means for electrodialytically splitting water. A useful apparatus is disclosed in U.S. Pat. No. 4,740,281. A useful means to split water to (H+) and (OH−) is a bipolar membrane such as disclosed in U.S. Pat. No. 4,766,161. The bipolar membrane is comprised of anion selective and cation selective layers of ion exchange material. In order for the membrane to function as a water splitter, the layers must be arranged so that the anion layer of each membrane is closer to the anode than the cation layer. A direct current passed through the membrane in this configuration will cause water splitting with hydroxyl ions being produced on the anode side and a corresponding number of hydrogen ions being produced on the cathode side of the membrane.

Electrodialytic water-splitting in a two-compartment cell has been disclosed, for example, in U.S. Pat. No. 4,391,680 relating to the generation of strongly acidified sodium chloride and aqueous sodium hydroxide from aqueous sodium chloride. U.S. Pat. No. 4,608,141 discloses a multi-chamber two-compartment electrodialytic water splitter and a method for using the same for basification of aqueous soluble salts. U.S. Pat. No. 4,536,269 discloses a multi-chamber two-compartment electrodialytic water splitter and a method for using the same for acidification of aqueous soluble salts. These two patents review the use of two-compartment electrodialytic water splitters to treat salts.

Three-compartment electrodialytic water splitters are disclosed to be comprised of alternating bipolar, anion and cation exchange membranes thereby forming alternating acid, salt and base compartments. U.S. Pat. No. 4,740,281 discloses the recovery of acids from materials comprising acid and salt using an electrodialysis apparatus to concentrate the acid followed by the use of an electrodialytic three-compartment water splitter to separate the acid from the salt.

The design of membranes for electrodialysis processes is complicated by the conflicting needs of obtaining low electrical resistance, high permselectivity and good mechanical properties. A high concentration of charged groups is necessary to achieve good permselectivity (permeation selectivity to either anions or cations) and considerable water swelling is needed to obtain a low resistance. In order to maintain good selectivity, swelling must be controlled. This can be accomplished by crosslinking the membrane resin or incorporating an inert matrix. Nearly all commercially available ion exchange membranes use a separate reinforcing fabric to support mechanically weak ion exchange material. Reinforced membranes are manufactured by Asahi Glass Co. (Tokyo, Japan) and Tokuyama Soda Co. Ltd. (Tokuyama City, Japan) under the trade name Selemion ® and Neoseptas ®. These are apparently prepared by the paste method as described by Y. Mizutani, R. Yamane, and H. Motomura, *Bull. Chem. Soc. Jpn.*, 38, 689 (1965). A fabric reinforcing material is an integral part of that process. Other widely available membranes, such as those of Ionics Inc. (Watertown, Mass.) and DuPont (Wilmington, Del.), also employ a fabric reinforcement to achieve good mechanical properties. Nafion ® membranes made by DuPont are available with and without fabric reinforcement. The use of a fabric reinforcing material can improve the burst strength of a membrane and especially improve its tear resistance. However, the use of the reinforcing material can cause problems: 1) roughness makes sealing difficult; 2) part of the area is blocked off by the fibers and is not available for transport; 3) cracking can occur along fibers; 4) precipitates can form inside the membrane because of the heterogeneity caused by the fibers.

Therefore it is desirable to use membranes which do not rely on a fabric reinforcement to achieve good mechanical properties. Such membranes can be produced by radiation grafting onto a polymer film with the base film serving to improve the mechanical properties. Such membranes are produced commercially under the trade name Raipore ® by RAI Research Corporation, Hauppauge, N.Y. Other membranes can be prepared by solvent casting a polyelectrolyte and matrix polymer as described in U.S. Pat. No. 4,012,324 or by casting solutions of ion containing polymers with sufficient charge density to be water swollen but with enough water insoluble material to resist swelling. This type of the cation membrane is described in U.S. Pat. No.

4,738,784. Similar anion and bipolar membranes are described U.S. Pat. No. 4,116,889 and U.S. Pat. No. 4,766,161.

The design and operation of electrodialysis stacks is well known in the art and is described, for example, by H. Strathmann in the chapter "Electrodialysis" in *Synthetic Membranes: Science, Engineering and Applications*, P. M. Bungay, H. K. Lonsdale, M. N. dePinho Editors, D. Reidel Publishing Co., Dordrecht, Holland. Careful design of the electrodialysis stack hardware and operation to minimize pressure differentials and surges can help reduce the failure rate in membranes which are not mechanically robust. Membranes which are not fabric reinforced generally will not fail in use, but should a membrane fail, it usually results in a large tear or hole because of the poor tear resistance of membranes which do not include a reinforcement. The resulting hole causes a leakage of solution between adjacent compartments and usually causes a loss of current efficiency, product concentration, and/or purity. The problem is especially acute when dealing with the concentrated solutions usually found in electrodialytic water splitting processes such as those described in U.S. Pat. No. 4,740,281, U.S. Pat. No. 4,504,373 and U.S. Pat. No. 4,557,815. The mixing of acid and base caused by failure of a bipolar membrane in an electrodialytic water splitting stack can greatly reduce process efficiency. If even one bipolar membrane in a stack of 100 rips, it is usually necessary to disassemble the stack and replace the broken membrane. Even though the cost of the membrane may not be significant, it is highly desirable to avoid shutting down the plant to perform this time consuming procedure. Reinforced bipolar membranes would be helpful, but the production of such membranes which retain the other desirable properties has proven difficult. In pressure driven membrane processes, it is well known to use a porous support to enhance the mechanical performance of otherwise weak membranes. Such structures have generally not been used in electrodialysis, probably because of problems with concentration polarization and delamination caused by differences in water transport between the layers.

It is desirable to minimize the effect of broken membranes on process efficiency and increase the interval between plant shutdowns caused by such leakage. It is also desirable to provide a system capable of improving the electrical performance of bipolar membranes.

U.S. patent application Ser. No. 590,116 discloses using a guard membrane oriented adjacent to and in contact with a first membrane. The guard membrane preferably has the same ion selectivity as the guard membrane and acts as a backup membrane should the first membrane break during use.

Further, it has been found that in the electrodialysis of weak acid systems guard membranes which are adjacent to the first membrane "separate" from the bipolar membranes. This results from formation of a non-conducting layer of weak acid or a bubble between the guard and the first membrane. The non-conducting layer greatly increases the potential drop across the cell to excessively high levels. For guard membranes to be practical in weak acid systems it is necessary to find guard membranes which will not separate from the first bipolar membrane during use.

SUMMARY OF THE INVENTION

The present invention relates to improved guard membranes which are suitable for use in the electrodialysis of weak acids. A highly water swollen, hydrophilic layer is added between the guard membrane and the first bipolar membrane to insure proper conductivity across the guard membrane-first membrane assembly. Alternatively the guard membrane may be treated to create the hydrophilic surface required. In either case the key to the present invention is the recognition of the necessity of adding a hydrogen ion conductive layer between the guard and bipolar membranes in weak acid systems. No such conductive layer is required in the electrodialytic treatment of strong acids, where membranes need only be adjacent, as disclosed in U.S. application Ser. No, 590,116.

BRIEF DESCRIPTION OF TEN DRAWINGS

In the Figures the following transport convention was used. Major (desired) transport is indicated by a solid arrow.

DESCRIPTION OF THE PREFERRED EMBODIMENTS

The present invention will be understood by those skilled in the art by reference to the accompanying Figures.

Figure 1:
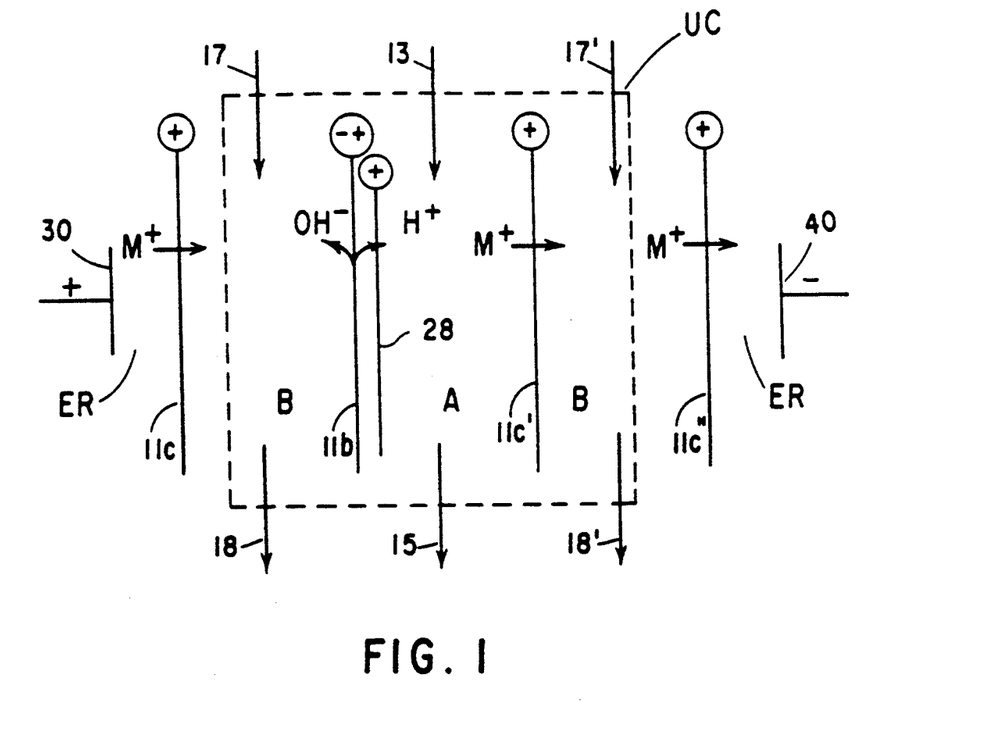
FIG. 1 is a schematic drawing of a two compartment electrodialytic water splitter of the present invention.
Figure 2:
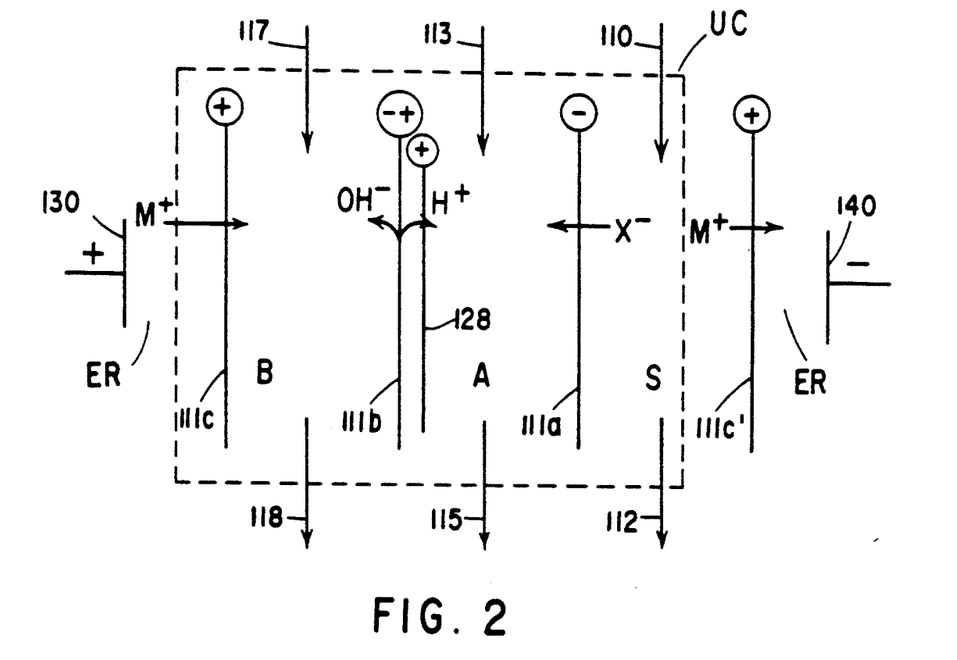
FIG. 2 is a schematic drawing of a three compartment electrodialytic water splitter of the present invention.

FIGS. 1 and 2 illustrate two electrodialytic water splitting configurations in which the present invention can be used. FIG. 1 is an electrodialytic water splitter comprising bipolar and cation membranes. FIG. 2 illustrates a three compartment electrodialysis water splitter incorporating the features of the present invention.

The embodiments of FIGS. 1 and 2 are presented for illustrative purposes. The guard membranes are preferably used adjacent to bipolar membranes in electrodialytic water splitters illustrated by the three compartment water splitter shown in FIG. 2.

The guard membrane can also be used in two compartment water splitters, as shown in FIG. 1.

The present invention is directed to the use of guard membranes in weak acid systems to prevent fluid leakage should the primary operative (first) membrane develop a leak or hole. Specifically, it has been found that in weak acid system guard membranes which are adherent to the first membrane via a conductive layer prevent the formation of non-conductive layers of acid which greatly increase the potential drop across the system. The guard membrane may be made adherent, or an adhesive layer must be added between the guard and bipolar membrane. The adhesion between the guard and first membranes acts as a conductive bridge, and insures a stable potential drop across the electrolytic unit. The improvement of the present invention is useful in electrodialytic apparatus useful for treating weak acids regardless of the specific configuration.

The improvement of the present invention is the placement of a guard membrane adjacent to and in contact with at least one first membrane selected from bipolar, cation and anion permselective membranes such that a conductive layer is formed between the two membranes. Preferably the first membrane is either a bipolar or a cation selective membrane and the guard a cation permselective membrane, and most preferably the first membrane is a bipolar membrane.

Any treatment which would alter the guard membrane to produce a hydrophilic surface which is incapable of migrating across the membranes may be used. Proper adhesion between the guard membrane and the first membrane may be achieved by adding a coating of "glue" between the membranes or by modifying the surface of the guard membrane. Appropriate adherent layers must be highly water swollen (at least about 50%), thin, highly conductive, highly charged and fixed between the guard and first membranes such that the ion conductive layer is incapable of permeating through either membrane.

For example, an appropriate glue may be made by precipitating a sulfonated polysulfone solution into hot water. The colloidal suspension is collected and spread onto the first membrane via any conventional method such as a roller, brush or spray. Microparticulate ion exchange resin of the type described in the first example of U.S. Pat. No. 4,116,189 may also be used as "glue" between the guard and first membranes. The "glue" layer can be coated onto either the first membrane or the guard membrane. The non-coated membrane is then placed on the coated side of the coated membrane.

Yet another option is to add a very high capacity sulfonated polysulfone or other highly sulfonated polymer layer to the guard membrane during casting. A layer of sulfonated polystyrene coated onto a sulfonated polysulfone yields a guard membrane having good adhesive properties and a stable potential drop when it is placed on a first membrane with the high capacity layer adjacent to the first membrane.

Alternatively, the guard membrane may be altered to insure proper adhesion. For example, the hydrophilicity of the guard membrane may be increased by wiping the adhering surface of the guard membrane with an appropriate solvent such as DNF (N,N-dimethyl formamide), DMSO (dimethylsulfoxide), or NMP (N-methylpyrolidone) followed by quick quenching in water. Partial dissolution of the guard membrane followed by water quenching is believed to result in a surface layer with higher water content than is formed by solvent evaporation. Guard membranes may also be immersed in acid and quenched in water. It is believed that acid immersion followed by water quenching increases the sulfonation of the guard membrane.

Care must be taken in assembly of the guard-bipolar membrane system. It is very important to avoid air bubbles between the two membranes, because the air bubbles "flatten out" when a current is passed across the cell to form a non-conductive bubble which covers a considerable portion of the active membrane surface. Application of liberal amounts of water or dilute electrolyte solution between the two membranes can be useful in eliminating air bubbles. For use in weak acid systems, the liquid applied is preferably a suspension of colloidal ionic polymer or microparticulate ion exchange resin.

The guard membranes of the prevent invention have particular utility in weak acid systems where complete adhesion of the guard and first membrane is critical. As used in the present invention, the term weak acid means an acid with a pKa of about 2 or more. Some benefit may be derived even with moderately strong acids such as sulfurous acid. While the guard membranes of the present invention work in strong acid systems, adhesion of the membranes is not required for strong acids, and assembly of the guard membrane systems which do not require a conductive layer is easier. Such membranes have been previously disclosed in U.S. Pat. No. 5,126,026. Accordingly, membranes of the present invention are preferred in weak acid systems, while nontreated guards are preferred for strong acid systems. The apparatus disclosed below are suitable for both weak and strong acid systems.

Employed in each unit cell are means for splitting water into hydrogen ions and hydroxyl ions (water-splitting membrane). Most preferably, the means for splitting water into hydrogen and hydroxyl ions is a bipolar membrane. Examples of bipolar membranes which are particularly useful include those described in U.S. Pat. No. 2,829,095 to Oda et al. (which has reference to water splitting generally), in U.S. Pat. No. 4,024,043 (which describes a single film bipolar membrane), and in U.S. Pat. No. 4,116,889 (which describes a cast bipolar membrane and is most preferred). However, any means capable of splitting water into hydrogen and hydroxyl ions may be used; for example, spaced apart anion and cation membranes having water disposed therebetween. The cation exchange membranes employed in the electrodialytic water splitters of the present invention may be moderately acidic (e.g., phosphoric group-containing) or strongly acidic (e.g., sulfonic group-containing) cation permselective membranes or acidic fluorocarbon cation permselective membranes. A variety of cation permselective membranes, available from Tokuyama Soda, e.g. Neosepta ® AV-4T and from Asahi Glass Co. e.g. Selemion ® CMV, are useful. Particularly useful cation membranes are DuPont's Nafion ® strongly acidic fluorocarbon membranes, especially Nafion ® 110 and 324 cation membranes. More preferably, the cation membranes are of the composition and construction disclosed in U.S. Pat. No. 4,738,764.

Anion membranes useful in the three compartment water splitter of the present invention are strongly, mildly or weakly basic anion permselective membranes. Useful membranes are, for example, Toyo Soda's DF43 or Asahi Glass Company's anion permselective membranes sold under the trade name Selemion ® ANV, ASV or AAV. Most preferably, the anion permselective membranes used in the present invention are the Asahi Glass Selemion ® AMV membranes.

FIG. 1 shows an schematic view of the two compartment water splitter of the present invention. The two compartment water splitter includes at least one unit cell which comprises a cation exchange membrane 11c' and a bipolar membrane 11b. Cation membranes 11c and 11c" separated the anode 30 and the cathode 40 from the unit cell. The unit cells are arranged to define alternating acid compartments (A) and base compartments (B).

The unit cells, which in practice may number up to two hundred or more, are arranged between an anode (+) 30 (e.g., a platinum anode) and a cathode (−) 40 (e.g., a platinum cathode).

Guard membrane 28 is a cation exchange membrane adjacent and adherent to the cation layer of bipolar ane 11b. Should bipolar membrane 11b break, guard membrane 28 would prevent the contents of the acid compartment from mixing with the contents of the neighboring base compartment.

The apparatus of FIG. 1 is useful, for example, for the recovery of acid from solutions comprising a salt $(M^+X^-)$ of the acid. In operation, an aqueous electrolyte solution, preferably comprised of a the sulfate or hydroxide of $M^+$ is supplied to electrode rinse compartments ER, and an aqueous solution, preferably comprising the hydroxide of $M^+$ is supplied via streams 17 and 17' to base compartments (B). A solution comprising salt is supplied to the acid compartment (A) via 13. Direct current is then passed from the anode 30 to the cathode 40 causing water to be split at the bipolar membrane, hydrogen ions ($H^+$) to be introduced into the acid compartment A, hydroxide ions ($OH^-$) to be introduced into the acid compartment B, and metal ions ($M^+$) of the salt to migrate toward the cathode 40. Both the metal ions and hydrogen ions are capable of passing through the cation membranes 11c, 11c' and 11c''. Anions are trapped in the acid compartment A and form acid with the hydrogen ions generated by bipolar membrane 11b. Accordingly, acid is formed in acid compartment A, and a basified stream is produced in base compartment B. When MX is the salt of a weak acid, the hydrogen ion concentration in acid compartment A remains low because of the low degree of ionization of HX. Most of the current is carried across the cation membrane 11c' by $M^+$ ions until the $M^+$ concentration is quite low. For salts of weak acids, e.g. sodium acetate or potassium formate, it is possible to convert almost all (>99%) of the salt introduced into acid compartments into acid if desired. with salts of moderately weak acids, e.g. KF or $Na_2SO_3$, conversion of 80% of the salt is generally feasible. The product from acid compartment A is then withdrawn via line 15. The basified solution from base compartments (B) is removed via lines 18 and 18'.

A three compartment electrodialytic water splitter comprising one unit cell (UC) is shown in FIG. 2. Features which are common to FIG. 1 have the same reference numbers, except that "100" has been added. Each unit cell comprises a cation, water-splitting, and anion membrane arranged in alternating fashion to define base (B), acid (A), and salt (S) compartments.

The three compartment electrodialytic water splitter may be employed to recover and regenerate acid and base from salt solutions. As illustrated, the three compartment electrodialytic water splitter comprises, in series, an anode 130 (e.g., a platinum anode), an anolyte compartment ER, unit cells (UC) of alternating base (B), acid (A), and salt (S) compartments, a catholyte compartment ER, and a cathode 140 (e.g., a platinum cathode). The base, acid and salt compartments of the three compartment water splitter illustrated in FIG. 2 are defined by a plurality of serially arranged membranes as follows: a cation permselective membrane 111c, a bipolar membrane 111b, anion permselective membrane 111a, and a cation permselective membrane 111c''. Although FIG. 2 shows four serially arranged membranes, the three compartment electrodialytic water splitters are defined by a plurality of unit cells, each unit cell (UC) comprising an anion membrane, a cation membrane and a bipolar membrane (or equivalent structures capable of splitting water into hydrogen and hydroxyl ions). The improvement of the present invention is at least one and preferably each cell having a monopolar cation guard membrane 128 adjacent and adherent to the cation layer of bipolar membrane 111b.

In accordance with a preferred embodiment of the present invention, the anolyte and catholyte compartments contain a salt, base or acid solution, the acid (A) and base (B) compartments initially contain a liquid comprising water, added via lines 113 and 117, respectively, salt S compartment initially contains a salt solution, added via line 110. Splitting of the salt into acid and base commences by applying a direct current through the water splitter from the anode to the cathode.

In the acid compartment (A) which is supplied with a liquid comprising water and, preferably, an electrolyte, hydrogen ions ($H^+$) are added via the function of the bipolar membrane 111b. The hydrogen ions pass through guard membrane 128 to the acid compartment (A). Simultaneously, anions (designated $X^-$ the drawings) of the salt(s) are transported across the anion membrane 111a into the acid compartment (A). The combination of the hydrogen ions with the anions yields an acid product HX. The designation $X^-$ (i.e., MX or HX) refers not only to monovalent anions but also to divalent anions, such as sulfates, and trivalent anions, such as phosphates, and mixtures thereof.

Cations in the salt compartment (S) simultaneously pass through the cation membrane 111c'' to the catholyte compartment, or to the base compartment of the adjacent unit cell. In the base (B) compartment, cations ($M^+$) that have migrated from the anolyte compartment, or from the salt compartment of the adjacent unit cell through cation membrane 111c combine with the hydroxyl ions ($OH^-$) generated by the bipolar membrane 111b to produce a basified solution.

In this cell configuration Metal ions ($M^+$) are added to the catholyte compartment from the salt S compartment of the unit cell adjacent to the cathode and removed from the anolyte compartment. Accordingly, the anolyte and catholyte solutions are typically continuously recirculated from a common reservoir to maintain a substantially constant concentration of electrolyte in each compartment.

The acid product from compartment (A) is removed via 115, the base product from base compartment (B) is removed via 118, and the depleted salt solution from compartment (S) is removed via 112.

The guard membrane (28 and 128 in FIGS. 1 and 2 respectively) has as its primary purpose to provide a backup should the bipolar membrane develop a leak. Additionally, the use of the separate guard membrane having ion selective properties can further help to control the operation of the electrodialytic apparatus. By carefully selecting the guard membrane, the efficiency for generation and purity of the product acid and base can be controlled and enhanced.

When assembling the stack, care must be taken to avoid trapping air bubbles between the guard and functional membranes. In the case of water splitting to form weak acids, e.g. acetic, tactic, or formic acid, high resistance can result upon operation of the water splitting even when air bubbles are eliminated completely. This high resistance is apparently the result of the formation of acid between the bipolar and guard membranes. The acid layer forms because of differences in ionic transport number between the cation exchange layer of the bipolar membrane and the adjacent guard membrane. In the case of strong, highly ionized acids, e.g. HCl or $H_2SO_4$, the formation of this layer is not important, since these acids are highly conductive. Formation of a layer of weak acid is detrimental to the operation of the water splitter because weak acid has very low conductivity. It is believed that the hydrophilic layer or coating of the present invention operates to reduce or eliminate this problem by acting as a strongly acidic, highly conductive bridge which because of its high molecular weight cannot be transported away from the interface between the guard and the bipolar membrane. Thus the addition of a highly conductive, immobile interface layer insures proper ion exchange across the electrolytic cell, while also adding mechanical strength, and decreasing the likelihood of solution contamination should the first membrane break.

A similar effect is observed when an anion permeable guard membrane is used adjacent to the anion surface of the bipolar membrane and a weak base is produced. In this case materials which are conductive to hydroxyl ions should be used to form the conductive layer between the bipolar and guard membranes.

Consideration of current efficiency, expense, size and the like, should be made in determining how many and what types of guard membranes to use. As indicated above, it is preferable that the guard membranes have higher permeability to water than the membrane layers to which they are adjacent. The primary operating function should be the operative membranes with the guard membranes being used for support and improvements in efficiency rather than total functionality with regard to the water splitting apparatus' goal.

The electrodialytic water splitter can be operated in a batch mode, a continuous mode, or variations thereof. Product solutions or portions thereof (e.g., when using a feed and bleed apportionment operation) may be recycled for further concentration. Mechanisms for serial feed through similar compartments (not shown) may be employed. These and other modifications, changes and alterations to the design of the water splitter will not affect the scope of the invention and will be obvious to those of ordinary skill. The electrodialytic water splitter is ordinarily supplied with a direct current ranging from about 30 amps/ft$^2$ (approximately 300 A/M$^2$) to about 200 amps/ft$^2$ (approximately 2000 A/m$^2$), preferably from about 80 A/ft$^2$ (approximately 800 A/m$^2$) to about 120 A/ft$^2$ (approximately 1200 A/m$^2$). The water splitter normally operates at a temperature of between about 10° C. and about 80° C., with a temperature range of between about 30° C. and 55° C. being preferred.

Start-up at lower than normal current density may be necessary if the stack potential drop is too high at first.

The following examples illustrate the practice of the present invention. The examples should not be construed as limiting the invention to anything less than that which is disclosed or which would have been obvious to one of ordinary skill in the art therefrom. Percents and parts are by weight unless otherwise indicated.

EXAMPLE 1

3.8 L of methylene chloride was placed in a 12 L flask. With stirring, 1000 g of polysulfone commercially available Udel P-1835 from Amoco Performance Products, Marietta, Oh. was added. After the polysulfone dissolved, the temperature was raised to 40° C. and 567 g of acetic anhydride was added over a period of 6 minutes. 421 g of 96% sulfuric acid was added over the next 30 minutes. During the acid addition, the temperature rose to 43° C. and reflux occurred. Following the addition the reaction was stirred at 40° C. for 23.5 hr. The reaction was then cooled to 30° C. and 250 mL of methanol followed by 1 L of N,N-dimethylformamide (DMF) was added. The methylene chloride was removed from the reaction mixture by vacuum distillation with periodic addition of DMF. The solution contained about 30% by weight non-volatiles including some impurities. The impurities may be removed by precipitation into concentrated NaCl solution and redissolution of the washed polymer, but purification is not necessary for use of the material as a guard membrane. Ion exchange capacity of the purified polymer was 1.36 meq/g.

EXAMPLE 2

A guard membrane was prepared from the solution of Example 1 by spreading the polymer solution on a glass plate with a doctor blade set at 15 mils and driving off the solvent in a forced convection oven at 125° for 10 minutes.

EXAMPLE 3

Figure 3:
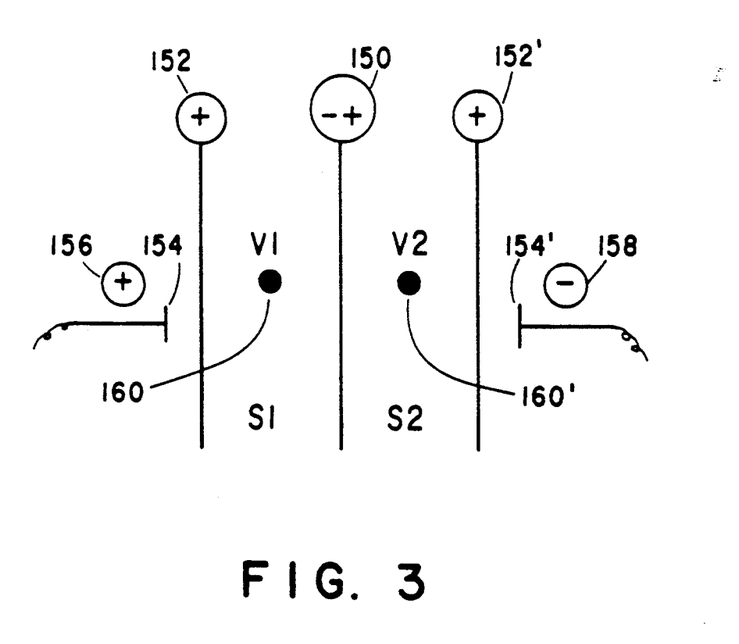
FIG. 3 is a schematic drawing of the apparatus used to test potential drop across membranes in Example 3.

A guard membrane prepared according to Example 2 was placed on the cation permselective side of a bipolar membrane prepared according to Example 1 of U.S. Pat. No. 4,766,161 and smoothed by hand to eliminate bubbles. No conductive layer was used. The potential drop of the combination was measured in the four compartment laboratory electrodialysis apparatus of FIG. 3 using 0.5M sodium sulfate at 30°. Sodium sulfate forms sulfuric acid, which is highly conductive, at the surface of the bipolar membrane. The compartments were separated by circular membranes having an exposed area of 11 cm$^2$. The outer compartments of the apparatus contained sodium sulfate solution and the electrodes (156 and 158) by which direct current was passed through the cell. Nafion ® 110 membranes (152, 152') separated the outer compartments (154, 154') from the inner compartments ($S_1$, $S_2$). The inner compartments were separated by the test membranes. Each of the inner compartments was equipped with a small Ag/AgCl electrode (160, 160'), 1 cm from the test membrane (150), which served as voltage probes. A direct current of 1.2 A (100 ASF) was applied across guard/bipolar membrane system. The voltage across the test membranes and solution was monitored as a function of time via the probes. The potential drop at 1.2 A (100 ASF) after subtracting the solution resistance is shown in Table 1 below.

TABLE 1

| Time (Minutes) | Net Potential Drop at 100 ASF (Volts) |
|---|---|
| 0 | 1.06 |
| 2 | 1.04 |
| 5 | 1.03 |
| 19 | 1.02 |
| 29 | 1.05 |
| 31 | 1.05 |

Without the guard membrane, the potential drop of the bipolar membrane measured in the same solution was 1.07 volts. Thus for use in systems forming strong acids, no modification is needed for this membrane to function as an efficient guard membrane.

EXAMPLE 4

Using a solution of 23% sodium acetate thermostated at 30° in the middle compartments of the electrodialytic cell described in Example 3, a stable (<0.001 V/min change) total potential drop of 3.6 volts was observed with a bipolar membrane prepared according to Example 1 of U.S. Pat. No. 4,766,161. The potential drop for a cell having no bipolar membranes was 2.3 volts. Thus, the net potential drop across the bipolar membrane was about 1.3 volts.

COMPARATIVE EXAMPLE 4A

Figure 4:
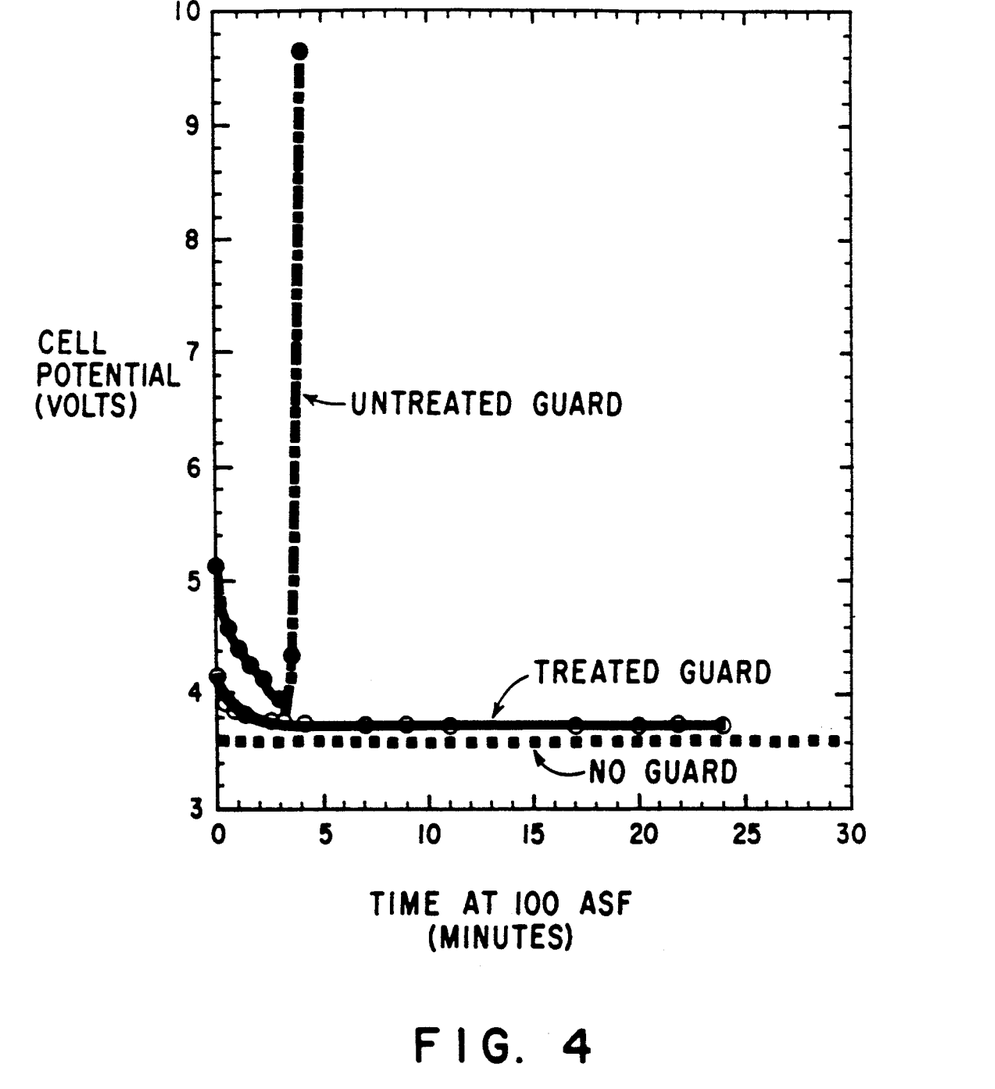
FIG. 4 is a graph showing the change in the cell potential over time.

The potential drop measurements of Example 4 were repeated, except that a guard membrane prepared in Example 2 was carefully placed adjacent to the cation layer of the bipolar membrane. The total potential drop (potential drop of the entire cell, without the potential drop of the solutions subtracted out) was measured with the result shown in Table 2 and FIG. 4.

TABLE 2

| Time (Minutes) | Total Potential Drop at 100 ASF (Volts) |
| --- | --- |
| 0.0 | 5.14 |
| 0.5 | 4.59 |
| 1.0 | 4.44 |
| 1.5 | 4.29 |
| 2.0 | 4.16 |
| 3.0 | 4.00 |
| 3.5 | 4.36 |
| 4.0 | 9.63 |

As can be seen (especially from FIG. 4) the potential drop was unstable and became very high after only 4 minutes. Accordingly, guard/first membrane combinations which do not have a conductive layer (such as those disclosed in U.S. Pat. No. 5,126,026) are not suitable for use in a weak acid system.

COMPARATIVE EXAMPLE 4B

The membranes were removed from the cell. The guard membrane was wiped with a paper towel moistened with DMF then rinsed immediately with water. The membranes were then reassembled in the cell and the potential drop was measured with the results shown in Table 3.

TABLE 3

| Time (Minutes) | Total Potential Drop at 100 ASF (Volts) |
| --- | --- |
| 0.0 | 4.15 |
| 0.5 | 3.89 |
| 1.0 | 3.83 |
| 1.5 | 3.82 |
| 2.5 | 3.79 |
| 3.0 | 3.79 |
| 4.0 | 3.76 |
| 7.0 | 3.74 |
| 9.0 | 3.72 |
| 11.0 | 3.71 |
| 17.0 | 3.73 |
| 20.0 | 3.72 |
| 22.0 | 3.73 |
| 24.0 | 3.72 |

The potential drop for the cell containing the DMF treated membranes of the present invention is much more stable than the untreated guard/bipolar membrane combination (Comparative Example 4A) and shows a potential drop which is only slightly higher than the 3.5 volt potential drop which was observed with an unguarded bipolar membrane (Example 4). Accordingly, treating guard membranes with DMF results in membranes having good stability and low potential drop in weak acid systems.

EXAMPLE 5

A sulfonated polysulfone was prepared according to the procedure of Example 1 using 25% more acetic anhydride and sulfuric acid to give material with an ion exchange capacity of 1.62 meq/g. This was purified by casting into sheets and extracting with water. A 15% solution was prepared by dissolving in methanol. A gelatinous material was prepared by adding 1 part of the methanol solution to 2 parts of water. A small amount of the gelatinous material was spread on the surface of the bipolar membrane and a guard membrane prepared according to Example 2 was placed on top. The potential drop in 23% sodium acetate solution was measured as above and the results are shown in Table 4.

TABLE 4

| Time (Minutes) | Total Potential Drop at 100 ASF (Volts) |
| --- | --- |
| 0.0 | 4.94 |
| 0.5 | 3.98 |
| 1.0 | 3.88 |
| 2.0 | 3.82 |
| 3.0 | 3.80 |
| 5.0 | 3.85 |
| 6.5 | 3.87 |
| 8.0 | 3.89 |
| 10.0 | 3.90 |

Table 4 clearly shows a low, stable total potential drop. Thus, guard membranes having a conductive layer of the sulfonated polysulfone display good conductive properties in a weak acid system.

COMPARATIVE EXAMPLE 5

The assembly was taken apart and both membranes rinsed thoroughly with water before reassembling. The potential drop across the cell was measured as above and the results are shown in Table 5, below.

TABLE 5

| Time (Minutes) | Total Potential Drop at 100 ASF (Volts) |
| --- | --- |
| 0.0 | 4.22 |
| 0.5 | 4.00 |
| 1.0 | 5.69 |

The potential drop measured wit out the gelatinous polyelectrolyte between the membranes was not stable as shown in Table 5. Accordingly, inclusion of a conductive layer such as the sulfonated polysulfone is critical to achieving a low and stable potential drop in a weak acid system, such as sodium acetate.

EXAMPLE 6

A guard membrane was prepared according to Example 2 and dipped into 96% sulfuric acid for 1 minute, then leached with water for 10 minutes. The treated guard membrane was carefully placed on top of the cation layer of the bipolar membrane so that no air bubbles were present between the membranes. The potential drop of this guard—bipolar membrane combination was measured in 23% sodium acetate as in the previous examples, and the results are shown in Table 6, below.

TABLE 6

| Time (Minutes) | Total Potential Drop at 100 ASF (Volts) |
| --- | --- |
| 0.0 | 3.75 |
| 1.0 | 3.75 |
| 2.5 | 3.90 |
| 4.0 | 3.98 |
| 5.5 | 3.88 |
| 7.0 | 3.85 |
| 11.5 | 3.76 |
| 14.0 | 3.74 |

Thus treating the guard membrane yielded a guard membrane which gave a low and stable potential drop. The result is believed to be because of additional sulfonation of the surface of the membrane or the solvent action of the sulfuric acid.

EXAMPLE 7

Sulfonated polysulfone was prepared according to the general procedure of Example 1 using 59 g of polymer in 170 mL of dichloromethane and 88 g of acetic anhydride and 67 g of sulfuric acid. Reaction time was extended to 100 h. After casting into sheets and extracting, the polymer had a swelling (g water/g dry membrane) of 8.0 and an ion exchange capacity of 2.71 meq/g.

EXAMPLE 8

A guard membrane was prepared as in Example 2. After cooling to room temperature a 5% solution of the sulfonated polymer of Example 7 was spread onto the guard membrane with a doctor blade with 5 mil clearance and the coated membrane was dried at 125° for 5 minutes. The guard and bipolar membranes were assembled with the coating next to the cation layer of the bipolar membrane as in the previous examples and the potential drop measured. Results are shown in Table 7 below.

TABLE 7

| Time (Minutes) | Net Potential Drop at 100 ASF (Volts) |
|---|---|
| 0.0 | 3.92 |
| 1.0 | 3.70 |
| 2.0 | 3.67 |
| 3.0 | 3.78 |
| 4.0 | 3.80 |
| 6.0 | 3.81 |
| 11.0 | 3.82 |
| 16.0 | 3.79 |
| 18.0 | 3.79 |
| 23.0 | 3.78 |

The total potential drop across the cell was low and stable. Thus, the sulfonated polysulfone polymer provides the necessary conductive bridge between the guard and bipolar membranes.

EXAMPLE 9

Sodium hydroxide forms the very weak acid, water, on the cation side of the bipolar membrane when it is split. A bipolar membrane in 0.5M NaOH had a net potential drop of 1.11 volts at 30° at 1.2 A/11 cm$^2$ current density. The total potential drop including the solution was 2.76 volts. When a guard membrane prepared according to Example 2 was placed next to the cation side of the bipolar membrane and a current of 1.2 A was passed, the potential drop was unstable as shown in Table 8.

TABLE 8

| Time (Minutes) | Total Potential Drop at 100 ASF (Volts) |
|---|---|
| 0.0 | 12.35 |
| .5 | 8.69 |
| 1.0 | 6.69 |
| 1.5 | 5.65 |
| 2.0 | 4.95 |
| 2.5 | 4.51 |
| 3.0 | 4.22 |
| 3.5 | 3.95 |
| 4.0 | 3.79 |
| 4.5 | 3.61 |
| 5.0 | 3.63 |
| 5.5 | 3.86 |
| 5.7 | 4.55 |

COMPARATIVE EXAMPLE 9

The membranes were separated, and one drop of 9.4% aqueous, microparticulate cation exchange resin prepared according to Example 2 of U.S. Pat. No. 4,766,161 was placed between the guard and bipolar membrane before it was returned to the cell. The total potential drop was measured as in Example 9. The potential drop was not very stable at first, but after standing idle in the cell for 1 hour, a stable potential drop was observed as shown in Table 9 below. In other cases, a stable potential drop was observed without the need to stand idle. A more uniform distribution of resin may have been obtained during the standing.

TABLE 9

| Time (Minutes) | Net Potential Drop at 100 ASF (Volts) |
|---|---|
| 0.0 | 3.01 |
| .5 | 2.92 |
| 1.0 | 2.91 |
| 1.5 | 2.93 |
| 2.0 | 2.96 |
| 2.5 | 2.99 |
| 3.0 | 3.02 |
| 3.5 | 3.03 |
| 4.0 | 3.02 |
| 4.5 | 3.01 |
| 5.0 | 2.99 |
| 11.0 | 2.91 |
| 13.0 | 2.92 |
| 14.0 | 2.92 |

While exemplary embodiments of the invention have been described, the true scope of the invention is to be determined from the following claims.

What is claimed is:

1. An electrodialysis apparatus comprising at least one unit cell comprising:
   at least one first membrane having at least one ion selective layer selected from the group consisting of anion selective layers and cation selective layers, and
   at least one separate guard membrane adjacent to said at least one first membrane wherein the improvement comprises an ionically conductive layer disposed between said at least one first membrane and said guard membrane such that said guard membrane adheres to said first membrane.

2. The electrodialysis unit of claim 1 wherein said ionically conductive layer is hydrophilic and highly water swollen.

3. The electrodialysis unit of claim 2 wherein said ionically conductive layer is formed by wiping a surface of said guard membrane with dimethylformamide.

4. The electrodialysis unit of claim 2 wherein said ionically conductive layer is sulfonated polysulfone.

5. The electrodialysis unit of claim 2 wherein said ionically conductive layer is a microparticulate ion exchange resin.

6. The electrodialysis unit of claim 1 wherein said ionically conductive layer is polymeric.

7. The apparatus as recited in claim 1 wherein the guard membrane is a cation selective membrane.

8. The apparatus as recited in claim 1 wherein the first membrane is a bipolar membrane having a cation selective layer and an anion selective layer.

9. The apparatus as recited in claim 8 wherein the guard membrane is a cation selective membrane.

10. The apparatus as recited in claim 8 further comprising:
at least on ion selective membrane serially aligned with the adjacent bipolar membrane and guard membrane, there being a product compartment between the ion selective membrane and the adjacent membranes; and
an aqueous salt solution feed compartment next to the product compartment with the ion selective membrane therebetween.

11. The apparatus as recited in claim 10 wherein the ion selective membrane is an anion selective membrane serially aligned next to said guard membrane.

12. The apparatus as recited in claim 10 wherein the ion selective membrane is an cation selective membrane serially aligned next to said anion layer of said bipolar membrane.

13. The apparatus as recited in claim 10 wherein the unit cell comprises:
at least one cation selective membrane serially aligned with the adjacent bipolar membrane and guard membrane, there being a base product compartment between said cation selective membrane and the serially aligned membranes;
at least one anion selective membrane serially aligned with the adjacent bipolar membrane and guard membrane, there being an acid product compartment between said anion selective membrane and the adjacent membranes; and
at least a portion of an aqueous salt solution feed compartment serially aligned with each product compartment with the ion selective therebetween.

14. A unit cell comprising:
at least one first membrane having at least one ion selective layer selected from the group consisting of anion selective layers and cation selective layers,
at least one separate guard membrane adjacent to said at least one first membrane, and
an ionically conductive layer between said guard and said at least one first membrane such that said guard membrane adheres to said at least one first membrane causing electrical potential drop across said membranes to remain low and stable when a current is passed across said membranes.

15. An improved method comprising the step of: electrodialytically treating an aqueous stream comprising at least one salt of a weak acid in an electrodialytic water splitter comprising at least one unit cell comprising at least one first membrane having at least one ion selective layer selected from the group consisting of anion selective layers and cation selective layers, at least one separate guard membrane adjacent to said at least one first membrane wherein the improvement comprises an ionically conductive layer disposed between said at least one first membrane and said at least one separate guard membrane such that said guard membrane adheres to said first membrane.

16. The method of claim 15 wherein the guard membrane is an ion permselective membrane.

17. The method as recited in claim 15 wherein said aqueous stream containing electrolytes is a weak acid stream.

18. The method of claim 15 wherein said ionically conductive layer is hydrophilic and highly water swollen.

19. The method of claim 18 wherein said ionically conductive layer is sulfonated polysulfone.

20. The method of claim 18 wherein said ionically conductive layer is a microparticulate ion exchange resin.

21. The method of claim 15 wherein said ionically conductive layer is polymeric.

22. The method of claim 15 wherein said ionically conductive layer is formed by wiping a surface of said guard membrane with dimethylformamide.

23. The method of claim 15 wherein said first membrane is a bipolar membrane having a cation layer and an anion layer and said guard membrane is a cation selective membrane adjacent to said cation layer of said bipolar membrane.

* * * * *